United States Patent
Yamamoto et al.

(10) Patent No.: US 6,548,180 B2
(45) Date of Patent: *Apr. 15, 2003

(54) AROMATIC POLYIMIDE FILM AND FILM LAMINATE

(75) Inventors: Tomohiko Yamamoto, Yamaguchi (JP); Takuji Takahashi, Yamaguchi (JP); Kohji Narui, Yamaguchi (JP); Hiroto Mitsui, Yamaguchi (JP); Norihisa Komoda, Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/969,804

(22) Filed: Oct. 2, 2001

(65) Prior Publication Data

US 2002/0058149 A1 May 16, 2002

(30) Foreign Application Priority Data

Oct. 2, 2000 (JP) .......................... 2000-302087
Jul. 30, 2001 (JP) .......................... 2001-230272

(51) Int. Cl.$^7$ .................... B32B 27/08; B32B 15/08; B32B 7/02

(52) U.S. Cl. .................. 428/473.5; 428/35.7; 428/35.8; 428/35.9; 428/36.7; 428/36.91; 428/213; 428/214; 428/215; 428/216; 428/357; 428/411.1; 428/458

(58) Field of Search .................. 428/473.5, 215, 428/213, 216, 214, 458, 411.1, 35.7, 35.8, 35.9, 36.7, 36.91

(56) References Cited

U.S. PATENT DOCUMENTS 5,849,397 A * 12/1998 Kohno et al. ............... 428/209
6,251,507 B1 * 6/2001 Yamamoto et al. ......... 428/215

* cited by examiner

Primary Examiner—P. Hampton-Hightower
(74) Attorney, Agent, or Firm—Reed Smith LLP

(57) ABSTRACT

An aromatic polyimide film of polyimide composed of a 3,3',4,4'-biphenyltetracarboxylic acid component and a p-phenylenediamine component, which has a thickness of 35 to 55 μm and is employed for manufacturing a polyimide film/metal film laminate, preferably has a linear thermal expansion coefficient of $17 \times 10^{-6}$ to $24 \times 10^{-6}$ cm/cm/° C. (TD) in the temperature range of 50–200° C., and a modulus of tensile elasticity of 700 kgf/mm$^2$ or more (TD), and has a surface having been subjected to discharge treatment.

14 Claims, No Drawings

AROMATIC POLYIMIDE FILM AND FILM LAMINATE

CROSS-REFERENCES TO RELATED APPLICATIONS

This application claims priority of Japanese Application Nos. 2000-302087 filed Oct. 2, 2000 and 2001-230272 filed Jul. 30, 2001, the complete disclosure of which are hereby incorporated by reference.

FIELD OF THE INVENTION

This invention relates to an aromatic polyimide film and further relates to an aromatic polyimide film laminate.

BACKGROUND OF THE INVENTION

Aromatic polyimide films show good high thermal resistance, good chemical properties, high electrical insulating property, and high mechanical strength, and therefore are widely employed in various technical fields. Particularly, an aromatic polyimide film made of polyimide comprising a 3,3',4,4'-biphenyltetracarboxlic acid component and a p-phenylenediamine component (hereinafter referred to as "BPDA-PPD polyimide film") shows prominently high resistance to heat treatment and chemical processing and further shows a high modulus of tensile elasticity.

Accordingly, the BPDA-PPD polyimide film is very favorably employable in the form of a continuous aromatic polyimide film/metal film composite sheet for manufacturing a flexible printed circuit board (FPC), a carrier tape for tape-automated-bonding (TAB), and a tape of lead-on-chip (LOC) structure.

Previously, a BPDA-PPD polyimide film for the use of manufacturing a carrier tape for TAB or others generally is a relatively thick film such as a film of 75 $\mu$m thick or 125 $\mu$m thick. Recently, however, a demand for utilizing a BPDA-PPD polyimide film having less thickness such as a thickness of less than 55 $\mu$m has increased to respond to requirements for manufacturing more compact electric elements and also for lowering the production cost.

A BPDA-PPD polyimide film having a less thickness such as a thickness of less than 55 $\mu$m can be prepared in the same manner as that employed for the preparation of a BPDA-PPD polyimide film having a thickness of 75 $\mu$m thick or 125 $\mu$m thick. It is assumed that the relatively thin BPDA-PPD polyimide film shows physical characteristics as high as those of the relatively thick BPDA-PPD polyimide film, so long as the same starting materials in the same ratio are employed. However, it has already been found that the thin BPDA-PPD polyimide film shows a less linear expansion coefficient as compared with that of the thick BPDA-PPD polyimide film. The reason is considered as follows:

An aromatic polyimide film is prepared by casting a dope of polyamic acid (i.e., a precursor of polyimide in a solvent) on a continuous belt support, heating the cast dope to give a self-supporting dope film having a less amount of a solvent, separating the dope film from the belt, and heating the dope film to a high temperature such as a temperature in the range of 300 to 550° C. In the step of casting a polyamic acid dope on a continuous belt support, polyamic acid molecules in its surface layer are oriented on the surface of the belt support. The orientation of the polymer molecules in the surface layer is considered to decrease of the linear expansion coefficient of the produced polyimide film. The orientation of the polymer molecules on the surface layer does not give noticeable effect to decrease the linear expansion coefficient of the polyimide film, so long at the film has a relatively large thickness. However, if the polyimide film is a thin film, the orientation of polymer molecules on the surface layer gives noticeable effect to decrease the linear expansion coefficient of the polyimide film.

It is known that an electrolytic copper foil, namely, a representative metal film, has a linear expansion coefficient of approximately $17 \times 10^{-6}$ cm/cm/° C. (in the temperature range of 50–200° C.) in its traverse direction (TD), while an aromatic polyimide film having a thickness of 75 $\mu$m or 125 $\mu$m has a linear expansion coefficient of approximately $20 \times 10^{-6}$ cm/cm/° C. (TD, in the temperature range of 50–200° C.). Accordingly, when a copper film is bonded to the thick aromatic polyimide film with or without a heat-resistant adhesive at a temperature of approximately 150 to 180° C., the produced copper film/polyimide film laminate shows a small curl in such manner that the copper foil takes an outer position, while the polyimide film takes an inner position after the bonded laminate is cooled to room temperature.

In contrast, an aromatic polyimide film having a thickness of less than 55 $\mu$m which is produced in the same manner as that for the producing the thick aromatic polyimide film generally has a linear expansion coefficient of less than $16 \times 10^{-6}$ cm/cm/° C. (TD, in the temperature range of 50–200° C.). Accordingly, when a copper film is bonded to the thin aromatic polyimide film with or without a heat-resistant adhesive at a temperature of approximately 150 to 180° C., the produced copper film/polyimide film laminate shows a noticeable curl in such manner that the copper foil takes an Inner position, while the polyimide film takes an outer position after the bonded laminate is cooled to room temperature. The curl of this type is industrially troublesome and should be avoided.

Until now, a variety of trials for improving physical characteristics of BPDA-PPD polyimide have been disclosed.

Japanese Patent Provisional Publication No. 61-2604027 describes that a polyimide film produced from biphenyltetracarboxylic dianhydride and p-phenylenediamine is heated under application of low tension to give a polyimide film having an increased dimensional stability.

Japanese Patent Publication No. H4-6213 discloses a dimensionally stable polyimide film having a linear expansion coefficient ratio (MD/TD) in a specific range and also having a linear expansion coefficient (MD) in a specific range.

Japanese Patent Publications No. 62-60416, No. 63-5421, and No. 63-5422 describe improvements of releasing easiness of an aromatic polyamic acid film in the dope casting stage.

Japanese Patent Publication No. H3-20130 describes a polyimide film comprising three or four components derived from biphenyltetracarboxylic acid or its derivative, pyromellitic acid or its derivative, phenylenediamine and/or diaminodiphenyl ether.

Japanese Patent Provisional Publications No. 4-198229 and No. 4-339835 disclose a process utilizing a substituted or unsubstituted nitrogen-containing heterocyclic compound.

These known technologies developed for improving certain physical characteristics, however, cannot produce a BPDA-PPD polyimide film having a thickness of 35 to 55 $\mu$m and having an appropriately large linear expansion coefficient.

A thin polyimide film having a thickness of 35 to 55 μm and having an appropriately large linear expansion coefficient is already known, so long as the polyimide film is produced from a combination other than the combination of 3,3',4,4'-biphenyltetracarboxylic acid or its reactive derivative and p-phenylenediamine. However, the polyimide film comprising a different combination shows relatively low thermal resistance and modulus of tensile elasticity.

SUMMARY OF THE INVENTION

It is an object of the present invention to provide a BPDA-PPD polyimide film having a small thickness such as a thickness of 35 to 55 μm, an appropriately high linear expansion coefficient and a satisfactory modules of tensile elasticity, and further having a surface on which different material such as adhesive is easily bonded.

It is another object of the invention to provide a metal film/polyimide film laminate having satisfactory physical characteristics and a large bonding force between the metal film and the polyimide film, and having no curl or a small curl in such manner that the metal film takes an inner position, while the polyimide film takes an outer position.

The present invention resides in an aromatic polyimide film of polyimide comprising a 3,3',4,4'-biphenyltetracarboxylic acid component and a p-phenylenediamine component, which has a thickness of 35 to 55 μm, a linear thermal expansion coefficient of $17 \times 10^{-6}$ to $24 \times 10^{-6}$ cm/cm/° C. in a traverse direction (TD) thereof in the temperature range of 50 to 200° C., a modulus of tensile elasticity of 700 kgf/mm$^2$ or more in a traverse direction (TD) thereof, and a surface which has been subjected to discharge treatment.

The invention further resides in an aromatic polyimide film laminate which comprises in order a polyimide film comprising a 3,3',4,4'-biphenyltetracarboxylic acid component and a p-phenylenediamine component, having a thickness of 35 to 55 μm, a linear thermal expansion coefficient of $17 \times 10^{-6}$ to $24 \times 10^{-6}$ cm/cm/° C. in a traverse direction thereof in the temperature range of 50 to 200° C., a modulus of tensile elasticity of 700 kgf/mm$^2$ or more in a traverse direction thereof, and having a surface which has been subjected to discharge treatment, an adhesive layer comprising a thermosetting adhesive, and a polymer film having a releasing layer on the surface facing the adhesive layer.

The invention furthermore resides in an aromatic polyimide film/metal film laminate which comprises in order a polyimide film comprising a 3,3',4,4'-biphenyltetracarboxylic acid component and a p-phenylenediamine component, having a thickness of 35 to 55 μm, a linear thermal expansion coefficient of $17 \times 10^{-6}$ to $24 \times 10^{-6}$ cm/cm/° C. in a traverse direction thereof in the temperature range of 50 to 200° C., a modulus of tensile elasticity of 700 kgf/mm$^2$ or more in a traverse direction thereof, and having a surface which has been subjected to discharge treatment, an adhesive layer comprising a thermosetting adhesive, and a metal film having a thickness of 3 to 35 μm.

The invention furthermore resides in an aromatic polyimide film/metal film laminate which comprises in order a polyimide film comprising a 3,3',4,4'-biphenyltetracarboxylic acid component and a p-phenylenediamine component, having a thickness of 35 to 55 μm, a linear thermal expansion coefficient of $17 \times 10^{-6}$ to $24 \times 10^{-6}$ cm/cm/° C. in a traverse direction thereof in the temperature range of 50 to 200° C., a modulus of tensile elasticity of 700 kgf/mm$^2$ or more in a traverse direction thereof, and having a surface which has been subjected to discharge treatment, and a metal film which has a thickness of 1 to 20 μm.

The preferred embodiments of the invention are described below:

(1) The aromatic polyimide film contains a filler of inorganic material having a mean particle size of 0.005 to 5 μm.

(2) The aromatic polyimide film has a thickness of 38 to 50 μm.

(3) The aromatic polyimide film in which the modulus of tensile elasticity is in the range of 750 to 1,100 kgf/mm$^2$.

(4) The aromatic polyimide film in which the surface of the polyimide film has been subjected to plasma discharge treatment.

(5) The aromatic polyimide film has a thermosetting adhesive film on the surface having been subjected to discharge treatment.

(6) The adhesive film of (5) above comprises a thermosetting polyimidesiloxane-epoxy adhesive.

(7) The aromatic polyimide film/metal film laminate in which the metal film is a copper film.

(8) The aromatic polyimide film/metal film laminate of (7) above in which the copper film has a surface roughness of 0.5 to 10 μm in terms of Rz.

(9) The aromatic polyimide film laminate has through-holes.

(10) The aromatic polyimide film employed for the production of a substrate of FPC or TAB, particularly for the production of an insulating substrate of IC package such as CSP or BGA.

(11) The aromatic polyimide film employed for the production of a substrate on which electronic parts are mounted to manufacture a laminated multi-layer circuit board.

DETAILED DESCRIPTION OF INVENTION

The aromatic polyimide film, polyimide laminate and metal film/polyimide film laminate according to the invention are described below in more detail.

The aromatic polyimide film of the invention is prepared from a combination of 3,3',4,4'-biphenyltetracarboxylic acid or its reactive derivative (e.g., halide, dianhydride, or ester) and p-phenylenediamine. From the viewpoint of industrial preparation, 3,3',4,4'-biphenyltetracarboxylic dianhydride is favorably employed.

In combination with the 3,3',4,4'-biphenyltetracarboxylic dianhydride, a relatively small amount of other aromatic tetracarboxylic dianhydrides such as 2,3,3',4-biphenyltetracarboxylic dianhydride, 3,3',4,4'-benzophenonetetracarboxylic dianhydride, and/or pyromellitic dianhydride can be employed.

Further, in combination with the p-phenylenediamine, a relatively small amount of other aromatic diamines such as 4,4'-diaminodiphenyl ether, 4,4'-diaminodiphenylpropane, 4,4'-diaminodiphenylethane, 4,4'-diaminodiphenylmethane, bis[4-(aminophenoxy)phenyl]propane, 2,2'-bis[4-(aminophenoxy)phenyl-1,1,1,3,3,3-hexafluoropropane, and/or bis[4-(4-aminophenoxy)phenyl]ether can be used.

The aromatic polyimide film of the invention can be prepared by the process set forth below.

In a polar organic solvent such as N,N-dimethylacetamide or N-methyl-2-pyrrolidone, 3,3',4,4'- biphenyltetracarboxylic dianhydride and p-phenylendiamine are reacted at a temperature of 10 to 80° C. for 1 to 30 hours, to give a polyamic acid solution in which a polymer concentration is in the range of 15 to 25 wt. %, the imidation ratio is 5% or less, a logarithmic viscosity of polymer is in the range of 1.5 to 5 (at 30° C., polymer of 0.5 g/100 mL of N-methyl-2-pyrrolidone), and a rotary viscosity is in the range of 500 to 4,500 poise (at 30° C.).

In the polyamic acid solution, a phosphorus compound such as an organic phosphorus compound (e.g., (poly)phosphoric ester, an amine salt of phosphoric ester) or an inorganic phosphorus compound is preferably placed in an amount of 0.01 to 5 weight parts, preferably 0.01 to 3 weight parts, more preferably 0.01 to 1 weight part, per 100 weight parts of the polyamic acid. M inorganic filler (e.g., colloidal silica, silicon nitride, talc, titanium dioxide, or calcium phosphate) having a mean size of 0.005 to 5 μm, particularly 0.005 to 2 μm, is also preferably placed in the polyamic acid solution.

The polyamic acid solution (i.e., dope solution) is then cast continuously on a metallic belt support having a smooth surface to form a dope solution film, and the dope solution film is dried to a temperature of 120 to 170° C. for 2 to 20 minutes to produce a self-supporting solid film containing volatile components (such as. the solvent and the by-produced water) in an amount of 25 to 40 wt. %. The self-supporting film is then separated from the belt support. If desired, a surface-treating agent such as an aminosilane coupling agent can be coated on the self-supporting film, and the coated film is again dried.

The self-supporting film is then gripped with gripping devices (e.g., pins or clips) of a tenter. The gripping devices are aligned in two lines and mounted on two driving chains. The gripped self-supporting film is then passed within a continuous heating furnace in which the film is heated to a maximum temperature in the range of approximately 400 to 525° C., particularly approximately 475 to 500° C., for 0.5 to 30 minutes. The distance between a pair of gripping devices placed on opposite sides of the film is adjusted to follow the width of the film which shrinks in the course of heat treatment. For instance, in the stage where the self-supporting film is dried to 300° C. and shrinks to have a minimum width, the distance between the gripping devices is gradually shortened to 0.95 time or more, preferably 0.95 to 0.99 time, as much as the original width (distance between gripping devices at 300° C./distance between gripping devices at room temperature). In the heating furnace, the self-supporting film (mainly consisting of polyamic acid) is dried and the polyamic acid is imidized to give polyimide. Thus, a continuous aromatic polyimide film containing no volatile components or a small amount (less than 0.4 wt. %) of volatile components are produced.

The obtained continuous polyimide film is preferably heated further to a temperature of 200 to 400° C. under no or low tension for relaxing the stress produced in the previous high temperature heat treatment and wound around a roll.

The polyimide film is then subjected on its surface to discharge treatment such as plasma discharge treatment (plasma discharge treatment in vacuo or at atmospheric pressure) or corona discharge treatment. The plasma discharge treatment in vacuo is preferred. The discharge treatment can be applied to a surface of the polyimide film after the surface is treated with an organic solvent such as acetone, isopropyl alcohol, or ethyl alcohol.

The plasma discharge treatment in vacuo is preferably performed at a pressure of 0.1 to 1500 Pa. The gas composition employed in the plasma discharge treatment preferably contains oxygen, or at least 20 molar % of rare gases such as He, Ne, Ar, and Xe. Ar is preferred. The rare gases may be mixed with $CO_2$, $N_2$, $H_2$ and/or $H_2O$ gas. The plasma discharge treatment can be conducted for a period of 1 second to 10 minutes.

On the surface subjected to the discharge treatment of the polyimide film of the invention can be placed a thermosetting or thermoplastic adhesive. Examples of the thermosetting adhesives epoxy resin, NBR-phenol resin, phenol-butyral resin, epoxy-NBR resin, epoxy-phenol resin, polyamide-epoxy resin, epoxy-polyester resin, epoxy-acryl resin, acryl resin, polyamide-epoxy-phenol resin, polyimide resin, polyimide-epoxy resin, and polyimidesiloxane-epoxy resin. Examples of the thermoplastic adhesives include polyamide resin, polyester resin, polyimide adhesive, and polyimide-siloxane adhesive. Preferred are polyamide-epoxy resin, polyimide-epoxy resin adhesive, polyimide adhesive, and polyimide-siloxane adhesive.

The adhesive preferably is a thermo-setting adhesive in the form of a film, namely, an adhesive film.

On the adhesive layer can be placed a protective film (e.g. polyethylene terephthalate film, PET film) having a releasing layer. Thus prepared multi-layer sheet is generally punched, subjected to laser treatment or chemically etched for producing through-holes. The multi-layer sheet is then combined with a metal film after separating the protective film, optionally after forming the through-holes.

The metal film preferably has a thickness of 3–35 μm, more preferably 5–35 μm, most preferably 5–20 μm.

Examples of the metal films include copper film, aluminum film, iron film, stainless steel film, gold film, palladium film, or a film of metal alloy. Preferred are an electrolytic copper film and a rolled copper film. The metal film preferably has a surface roughness (Rz) of 0.5 to 10 μm, more preferably less than 7 μm. A metal film having such surface roughness is available under the name of VLP or LP (or HTE) for a copper film.

The metal film is combined with the polyimide film having an adhesive layer by the steps of placing a metal film on the adhesive layer of the polyimide layer, and heating the composite product to 80–200° C., preferably 150–180° C. at a pressure of 0.2 to 30 $kg/cm^2$.

The metal film can be placed on the polyimide film directly or via an adhesive layer, by a physico-chemical process such as vacuum deposition, electron beam deposition, sputtering, or a chemical process such as chemical plating. The physico-chemical process is preferably performed at a pressure of $10^{-5}$ to 1 Pa and a deposition rate of 5 to 500 nm per sec. DC magneto sputtering at a pressure of less than 13 Pa, specifically 0.1 to 1 Pa, is preferably employed, keeping the composite polyimide film at a temperature of 20 to 450° C. and adjusting the deposition rate at 0.5 to 500 angstrom per se. The chemical plating and the physico-chemical deposition can be employed in combination.

The metal film can be composed of two or more metal layers. For instance, the lower metal layer can be made of chromium, titanium, palladium, zinc, molybdenum, nickel, cobalt, zirconium, iron, and one of their metal alloys. The upper metal layer or an intermediate metal layer can be made of copper. The chemical-plating is generally performed using copper.

It is preferred that the metal film is composed of a deposited lower metal layer and a chemically plated upper metal layer. The metal film generally has a thickness of 1 to 20 μm.

The invention is further described by the following examples.

In the following examples, the physical characteristics were determined by the methods described below (in which the measurements are performed at 25° C., unless otherwise indicate):

(1) Linear Expansion Coefficient (50 to 200° C.)

The sample is heated to 300° C. for 30 minutes for relaxing stress in the sample and subsequently measured by means of a TMA apparatus (tensile mode: 2 g weight, length of sample: 10 mm, 20° C./min.)

(2) Modulus Tensile Strength

The sample is measured according to ASTM D882 (MD)

(3) Heat Shrinkage

The sample is measured according to JIS C2318 (at 200° C.)

(4) Curling

An electrolytic copper foil (thickness: 18 µm, width: 40 mm, Rz: approximately 6 µm, 3EC-VLP, available from Mitsui Metal Mining Co., Ltd.) is combined with a sample polyimide film (width: 48 mm) via a polyimidesiloxane-epoxy adhesive film (thickness: 25 µm, Upitite, available from Ube Industries, Ltd.) by heating the laminated product to 180° C. at 20 kg/cm$^2$ for 360 minutes at 3 minutes after pre-heating. Thus combined product is kept at 23° C., 65% RH for 24 hours. Then, the product is placed on a plane surface by fixing one end onto the plane surface. The height of another end is measured to determine a value of curling.

(5) Adhesion Strength

The same combined product as that obtained in (4) above is measured on its 90° peel strength at a tensile rate of 50 mm/min.

EXAMPLE 1

In a reaction vessel were successively placed 100 weight parts of N,N-dimethylacetamide, 5.897 weight parts of p-phenylenediamine, and 16.019 weight parts of 3,3',4,4'-biphenyltetracarboxylic dianhydride. The resulting mixture was stirred at 40° C. for 3 hrs under nitrogen stream, to give an polyamic acid solution (polymer content: 18 weight %, logarithmic viscosity of polymer: 1.8 at 30° C., 0.5 g of polymer/100 mL of N,N-dimethylacetamide, solution viscosity: 1,800 poise (at 30° C., by means of a rotary viscometer).

Into the polyamic acid solution were added 0.1 weight part of monostearyl phosphate triethanolamine salt and 0.5 weight part of colloidal silica (mean particle size: 0.08 µm), per 100 weight parts of the polyamic acid. Thus, a dope solution was prepared.

The dope solution was continuously extruded from a slit of a T-die onto a plane metal belt support to give a solution film. The solution film was heated to a temperature of 120–160° C. for 10 minutes to produce a self-supporting dry film. The dry film (content of volatile ingredients: 34.4 wt. %) was separated from the belt support and further dried to give a dry film having a volatile ingredient content of 28.5 wt. %.

The self-supporting film was then gripped with gripping devices of a tenter. The gripping devices were aligned in two lines and mounted on two driving chains. The gripped self-supporting film was then passed within a continuous heating furnace in which the film was heated to 300° C. In this stage, the distance between a pair of gripping devices placed on opposite sides of the film was adjusted to follow the width of the film which shrinks in the course of heat treatment. The distance between the gripping devices was gradually shortened to 0.95 time as much as the original width (distance between gripping devices at 300° C./distance between gripping devices at room temperature). In the heating furnace, the self-supporting film (mainly consisting of polyamic acid) was dried, and most of polyamic acid was imidized to give polyimide. The film was then heated to a maximum temperature (approx. 500° C.) for 0.5 minutes, and thus a continuous aromatic polyimide film (thickness: 50 µm) containing a small amount (less than 0.4 wt. %) of volatile ingredients was produced.

The polyimide film was then subjected on its both surfaces to low temperature plasma discharge treatment at a discharge density of 6.2 kw·min/m$^2$ in a stream of a gaseous mixture of Ar/He/H$_2$/O$_2$.

A polyethylene terephthalate film (PET film, thickness: 20 µm) having a releasible surface and the polyimide film having been subjected to the plasma discharge treatment were combined via a polyimidesiloxane-epoxy thermosetting adhesive film (thickness: 25 µm) to give a laminated product.

The PET film was separated from the laminated product. Subsequently, an electrolytic copper film (thickness: 18 µm, width: 40 mm, Rz: approx. 6 µm, 3EC-VLP, available from Mitsui Metal Mining Co., Ltd.) was placed on the adhesive film and placed at 20 kg/cm$^2$ at a temperature of 180° C. for 360 minutes, to give a copper film-laminated product.

The copper film-laminated product was measured in its physical characteristics in the aforementioned manner. The results are set forth below:

Thickness of polyimide film: 50 µm
Linear expansion coefficient (50–200° C., TD):
  22.5×10$^{-6}$ cm/cm/° C.
Modulus tensile elasticity: 749 kgf/mm$^2$
Value of curling of copper film-laminated product:
  1.0 mm, copper film on outer side
Adhesion strength: 1.3 kg/cm

EXAMPLE 2

The procedures of Example 1 for preparing a self-supporting dry film were repeated except for omitting the further drying procedure after separation from the belt support.

The self-supporting dry film was then heated in a heating furnace in the same manner as in Example 1 to give a continuous polyimide film (thickness: 50 µm, content of volatile ingredients: less than 0.4 wt. %). The continuous polyimide film was subjected to low temperature plasma discharge treatment in the same manner as in Example 1.

The continuous polyimide film having been subjected to plasma discharge treatment was then combined with a copper film via an adhesive film in the same manner as in Example 1, to give a copper film-laminated product.

The copper film-laminated product was measured in its physical characteristics in the aforementioned manner. The results are set forth below:

Thickness of polyimide film: 50 µm
Linear expansion coefficient (50–200° C., TD):
  22.3×10$^{-6}$ cm/cm/° C.
Modulus tensile elasticity: 731 kgf/m$^2$
Value of curling of copper film-laminated product:
  1.0 mm, copper film on outer side
Adhesion strength: 1.3 kg/cm

COMPARISON EXAMPLE 1

The procedures of Example 1 for preparing a self-supporting dry film were repeated except for omitting the further drying procedure after separation from the belt support.

The self-supporting film was then gripped with gripping devices of a tenter of the same type as in Example 1. The gripped self-supporting film was then passed within a continuous heating furnace in which the film was heated to 300° C. In this stage, the distance between a pair of gripping devices placed on opposite sides of the film was maintained at a predetermined value. In the heating furnace, the self-supporting film (mainly consisting of polyamic acid) was dried, and most of polyamic acid was imidized to give polyimide. The film was then heated to a maximum temperature (approx. 500° C.) for 0.5 minutes, and thus a continuous aromatic polyimide film (thickness: 50 μm) containing a small amount (less than 0.4 wt. %) of volatile ingredients was produced.

The continuous polyimide film was subjected to low temperature plasma discharge treatment in the same manner as in Example 1.

The continuous polyimide film having been subjected to plasma discharge treatment was then combined with a copper film via an adhesive film in the same manner as in Example 1, to give a copper film-laminated product.

The copper film-laminated product was measured in its physical characteristics in the aforementioned manner. The results are set forth below:

Thickness of polyimide film: 50 μm

Linear expansion coefficient (50–200° C., TD): $15.4 \times 10^{-6}$ cm/cm/° C.

Modulus tensile elasticity: 896 kgf/mm$^2$

Value of curling of copper film-laminated product: 20.0 mm, copper film on inner side Adhesion strength: 1.2 kg/cm

What is claimed is:

1. An aromatic polyimide film of polyimide comprising a 3,3',4,4'-biphenyltetracarboxylic acid component and a p-phenylenediamine component, which has a thickness of 35 to 55 μm, a linear thermal expansion coefficient of $17 \times 10^{-6}$ to $24 \times 10^{-6}$ cm/cm/° C. in a traverse direction thereof in the temperature range of 50 to 200° C., a modulus of tensile elasticity of 700 kgf/mm$^2$ or more in a traverse direction thereof, and a surface which has been subjected to discharge treatment.

2. The aromatic polyimide film of claim 1, which contains a filler of inorganic material having a mean particle size of 0.005 to 5 μm.

3. The aromatic polyimide film of claim 1, which has a thickness of 38 to 50 μm.

4. The aromatic polyimide film of claim 1, wherein the modulus of tensile elasticity is in the range of 750 to 1,100 kgf/mm$^2$.

5. The aromatic polyimide film of claim 1, wherein the surface of the polyimide film has been subjected to plasma discharge treatment.

6. The aromatic polyimide film of claim 1, which has a thermosetting adhesive film on the surface having been subjected to discharge treatment.

7. The aromatic polyimide film of claim 6, wherein the adhesive film comprises a thermosetting polyimide-siloxane-epoxy adhesive.

8. An aromatic polyimide film laminate which comprises in order a polyimide film comprising a 3,3',4,4'-biphenyltetracarboxylic acid component and a p-phenylenediamine component, having a thickness of 35 to 55 μm, a linear thermal expansion coefficient of $17 \times 10^{-6}$ to $24 \times 10^{-6}$ cm/cm/° C. in a traverse direction thereof in the temperature range of 50 to 200° C., a modulus of tensile elasticity of 700 kgf/mm$^2$ or more in a traverse direction thereof, and having a surface which has been subjected to discharge treatment, an adhesive layer comprising a thermosetting adhesive, and a polymer film having a releasing layer on the surface facing the adhesive layer.

9. The aromatic polyimide film laminate of claim 8, which has through-holes.

10. An aromatic polyimide film/metal film laminate which comprises in order a polyimide film comprising a 3,3',4,4'-biphenyltetracarboxylic acid component and a p-phenylenediamine component, having a thickness of 35 to 55 μm, a linear thermal expansion coefficient of $17 \times 10^{-6}$ to $24 \times 10^{-6}$ cm/cm/° C. in a traverse direction thereof in the temperature range of 50 to 200° C., a modulus of tensile elasticity of 700 kgf/mm$^2$ or more in a traverse direction thereof, and having a surface which has been subjected to discharge treatment, an adhesive layer comprising a thermosetting adhesive, and a metal film having a thickness of 3 to 35 μm.

11. The aromatic polyimide film/metal film laminate of claim 10, wherein the metal film is a copper film.

12. The aromatic polyimide film/metal film laminate of claim 11, wherein the copper film has a surface roughness of 0.5 to 10 μm in terms of Rz.

13. An aromatic polyimide film/metal film laminate which comprises in order a polyimide film comprising a 3,3',4,4'-biphenyltetracarboxylic acid component and a p-phenylenediamine component, having a thickness of 35 to 55 μm, a linear thermal expansion coefficient of $17 \times 10^{-6}$ to $24 \times 10^{-6}$ cm/cm/° C. in a traverse direction thereof in the temperature range of 50 to 200° C., a modulus of tensile elasticity of 700 kgf/mm$^2$ or more in a traverse direction thereof, and having a surface which has been subjected to discharge treatment, and a metal film which has a thickness of 1 to 20 μm.

14. An aromatic polyimide film of polyimide consistently essentially of a 3,3',4,4'-biphenyltetracarboxylic acid component and a p-phenylenediamine component, which has a thickness of 35 to 55 μm, a linear thermal expansion coefficent of $17 \times 10^{-6}$ to $24 \times 10^{-6}$ cm/cm/° C. in a traverse direction thereof in the temperature range of 50 to 200° C., a modulus of tensile elasticity of 700 kgf/mm$^2$ or more in a traverse direction othereof, and a surface which has been subjected to discharge treatment.

* * * * *

UNITED STATES PATENT AND TRADEMARK OFFICE
CERTIFICATE OF CORRECTION

PATENT NO. : 6,548,180 B2
DATED : April 15, 2003
INVENTOR(S) : Tomohiko Yamamoto et al.

It is certified that error appears in the above-identified patent and that said Letters Patent is hereby corrected as shown below:

Column 10,
Line 46, "consistently" should be -- consisting --
Line 53, "otherof" should be -- thereto --.

Signed and Sealed this

Seventh Day of September, 2004

JON W. DUDAS
*Director of the United States Patent and Trademark Office*